(12) United States Patent
Averty et al.

(10) Patent No.: US 12,708,239 B2
(45) Date of Patent: Aug. 18, 2026

(54) HOUSEHOLD APPLIANCE FOR CULINARY PREPARATION COMPRISING A CONTROL PANEL

(71) Applicant: SEB S.A., Ecully (FR)

(72) Inventors: Lionel Averty, Dardilly (FR); Yoann Morin, Martigne-sur-Mayenne (FR)

(73) Assignee: SEB S.A., Ecully (FR)

( * ) Notice: Subject to any disclaimer, the term of this patent is extended or adjusted under 35 U.S.C. 154(b) by 532 days.

(21) Appl. No.: 18/268,035

(22) PCT Filed: Dec. 17, 2021

(86) PCT No.: PCT/EP2021/086577

§ 371 (c)(1),
(2) Date: Jun. 16, 2023

(87) PCT Pub. No.: WO2022/129565

PCT Pub. Date: Jun. 23, 2022

(65) Prior Publication Data

US 2024/0065483 A1 Feb. 29, 2024

(30) Foreign Application Priority Data

Dec. 18, 2020 (FR) ...................................... 2013616

(51) Int. Cl.
*A47J 43/00* (2006.01)
*A47J 43/07* (2006.01)
(Continued)

(52) U.S. Cl.
CPC ......... *A47J 43/0711* (2013.01); *A47J 43/082* (2013.01); *A47J 2043/04481* (2013.01)

(58) Field of Classification Search
CPC .................. A47J 43/0711; A47J 43/082; A47J 2043/04481
See application file for complete search history.

(56) References Cited

U.S. PATENT DOCUMENTS 3,224,743 A * 12/1965 Freedman ............... A47J 44/02 312/30
2018/0242595 A1* 8/2018 Huerta-Ochoa ...... A47J 36/321

FOREIGN PATENT DOCUMENTS

CN 205162720 U 4/2016
DE 1454117 A1 2/1969

OTHER PUBLICATIONS

International Search Report for PCT/EP2021/086577 mailed May 2, 2022. 3 pgs.

* cited by examiner

*Primary Examiner* — Anshu Bhatia
(74) *Attorney, Agent, or Firm* — Lerner David LLP

(57) ABSTRACT

A household appliance for culinary preparation includes a base intended to rest on a worktop and a head mounted movable relative to the base, the base forming a stand, the base having a control panel tilted backward relative to the stand, with a backward inclination of between 5° and 45° relative to the direction perpendicular to the work surface. The base has a primary upright member adjacent to the stand. The head is mounted on the primary upright member. The base has a secondary upright member rising from the stand laterally relative to the primary upright member and the head. The secondary upright member is connected to the primary upright member.

The secondary upright member rises away from the head and the control panel is arranged on the secondary upright member.

18 Claims, 2 Drawing Sheets

(51) Int. Cl.

| | |
|---|---|
| ***A47J 43/08*** | (2006.01) |
| *A47J 43/044* | (2006.01) |

[Fig 1]
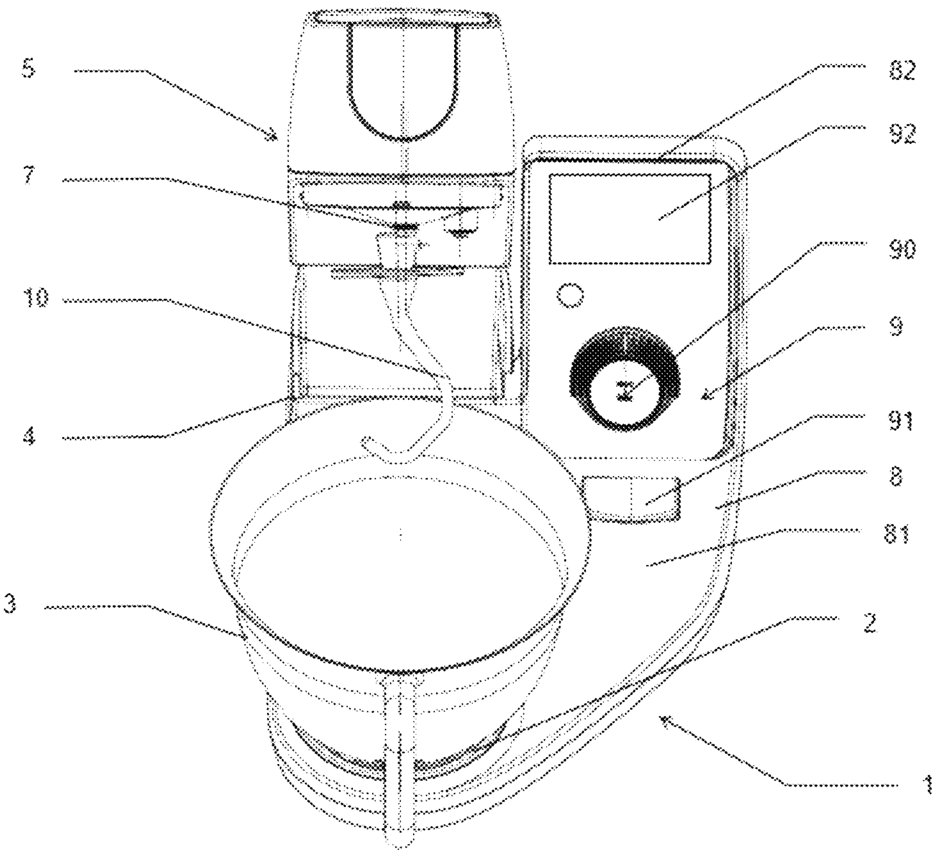
[Fig 2]
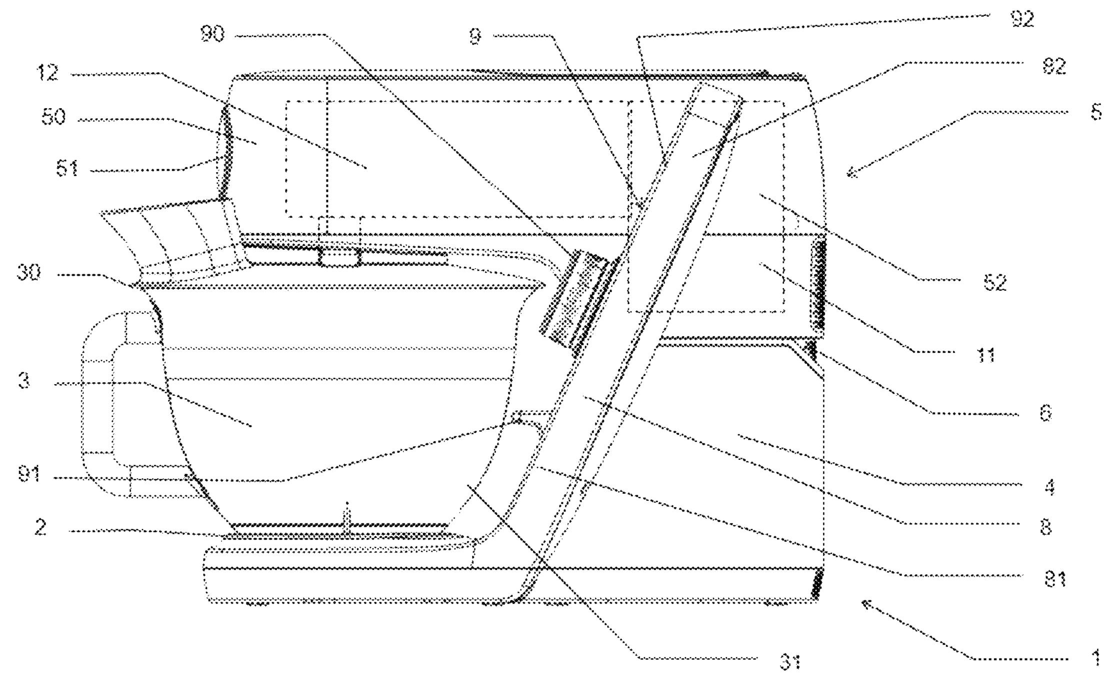

[Fig 3]
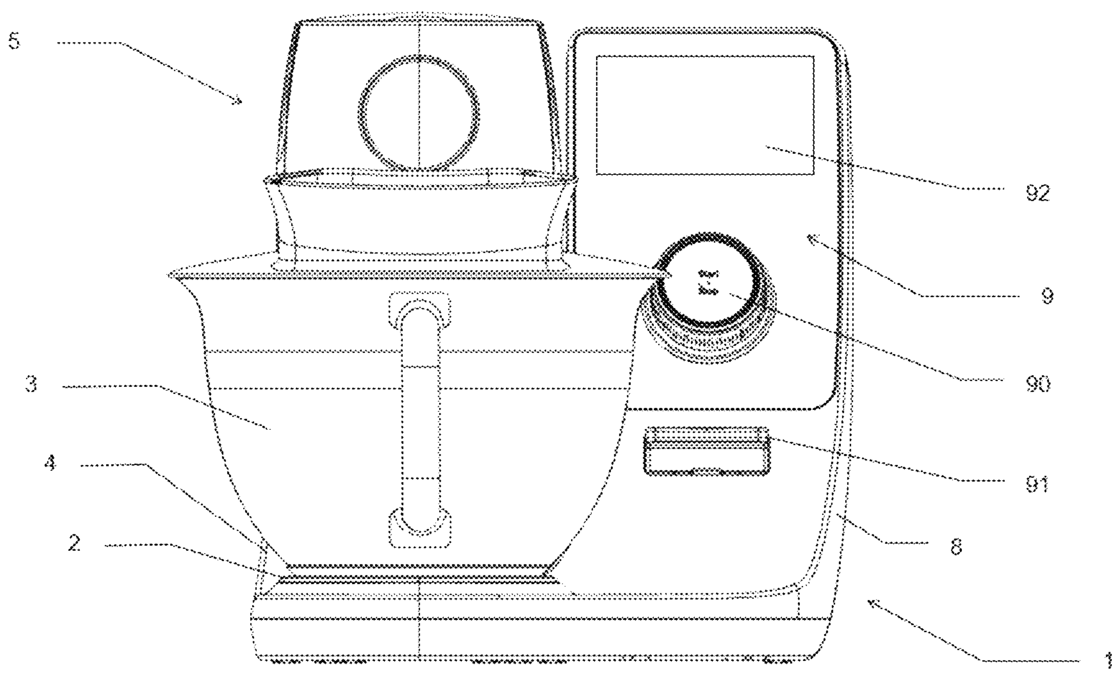
[Fig 4]
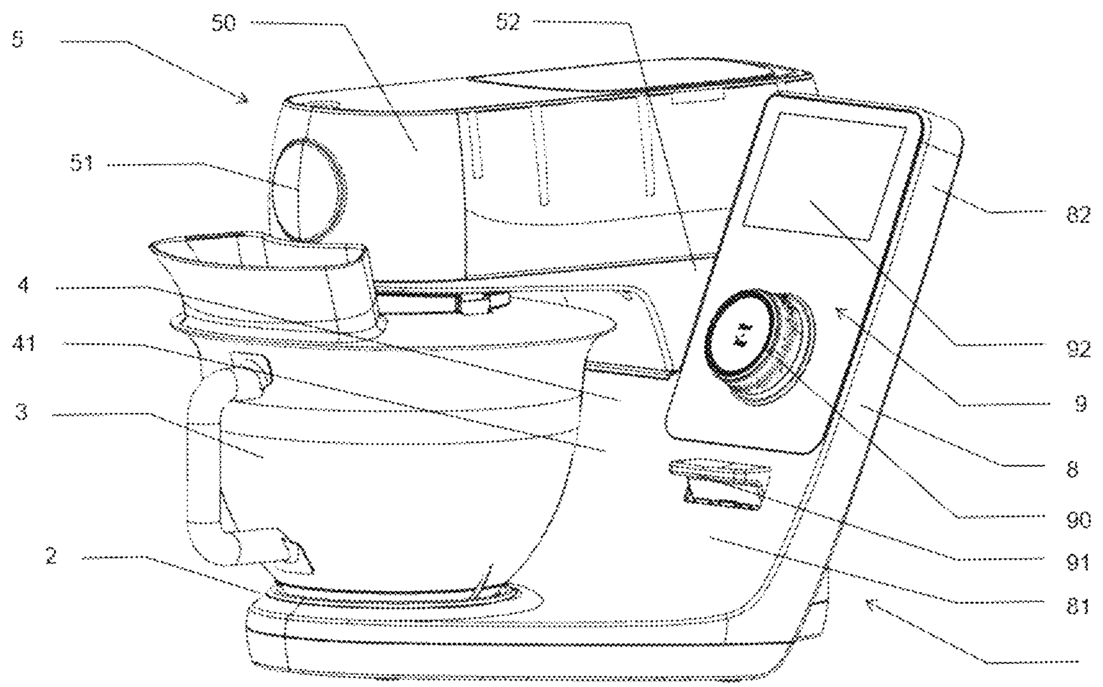

HOUSEHOLD APPLIANCE FOR CULINARY PREPARATION COMPRISING A CONTROL PANEL

CROSS-REFERENCE TO RELATED APPLICATIONS

The present application is a national phase entry under 35 U.S.C. § 371 of International Application No. PCT/EP2021/086577, filed Dec. 17, 2021, published in French, which claims priority to French Application No. 2013616 filed Dec. 18, 2020, the disclosures of which are incorporated herein by reference in their entireties.

TECHNICAL FIELD

The present invention generally relates to the field of household appliances for culinary preparation.

The present invention relates more specifically to household appliances for culinary preparation comprising a base forming a stand configured to receive a working bowl and a head having a driver arranged above the stand and configured to be coupled to a food processing accessory extending into the working bowl.

The present invention relates in particular, but not exclusively, to household appliances for culinary preparation comprising a control and/or information screen.

STATE OF THE ART

Document WO200788320 discloses producing a household appliance for culinary preparation of the aforementioned type in which a screen is arranged on a side face of the head. This arrangement enables the screen to be arranged at a good reading height. However, this provision has the disadvantage of arranging the screen on a part of the appliance that is subject to severe vibration during operation. Also, when the head is raised from the stand, it may be more difficult, or even impossible to read the screen.

Document CN205162720U discloses producing a household appliance for culinary preparation of the aforementioned type in which a touch screen is arranged laterally relative to the working bowl and to the head, said screen being slightly raised relative to the horizontal. Such an embodiment makes it possible to obtain an appliance in which the control panel is easily accessible. This control panel location, however, has the disadvantage of being adjacent to the working bowl, resulting in risks of the control panel being soiled when adding ingredients to the working bowl as well as risks of damage to the control panel when handling the working bowl when installing or removing it.

SUMMARY OF THE INVENTION

A purpose of the present invention is to remedy these disadvantages by proposing a household appliance for culinary preparation comprising a base forming a stand configured to receive a working bowl and a head having a driver arranged above the stand, wherein the ergonomics of use is improved.

To this end, a purpose of the invention is a household appliance for culinary preparation comprising a base intended to rest on a worktop and a head mounted movable relative to the base, the base forming a stand configured to receive a working bowl, the head having a driver arranged above the stand and configured to be coupled to a food processing accessory, the base having a control panel, the control panel being tilted backward relative to the stand, with a backward inclination of between 5° and 45° relative to the direction perpendicular to the worktop, the base having a primary upright member adjacent to the stand, with the head mounted on the primary upright member, the base having a secondary upright member rising from the stand laterally relative to the primary upright member and to the head, the secondary upright member being connected to the primary upright member due to the fact that the secondary upright member rises away from the head and that the control panel is arranged on the secondary upright member.

The secondary upright member may have a top that rises laterally away from the head, with the control panel arranged on the top of the secondary upright member.

The object of the invention is also a household appliance for culinary preparation comprising a base intended to rest on a worktop and a head mounted movable with respect to the base, the base forming a stand configured to receive a working bowl, the base having a control panel, the base having a primary upright member adjacent to the stand, with the head mounted on the primary upright member, the head having a driver arranged above the stand and configured to be coupled to a food processing accessory, due to the fact that the control panel is arranged on a secondary upright member rising from the stand laterally to the primary upright member and to the head, and that the secondary upright member is connected to the primary upright member, and the control panel is tilted back from the stand, with a backward inclination of between 5° and 45° relative to the direction perpendicular to the worktop.

These provisions allow for easy access to the control panel and working bowl, while moving the control panel away from the working bowl when the working bowl is in place on the stand, and while moving the control panel away from the changing area of the working bowl when the user removes or places the working bowl. These provisions enable the use of the appliance in a frontal orientation. The user can position the primary upright member of the household appliance for culinary preparation according to the invention behind the stand. The control panel placed laterally relative to the head is then easily accessible, regardless of the head position. Access to appliance controls is facilitated. This allows the user to easily access the controls, add ingredients to the working bowl, change processing accessories, handle the working bowl, without necessarily having to change position in relation to the appliance. Access to the working bowl is facilitated, since the access area is clear on both sides of the working bowl as well as in front of the working bowl. The secondary upright member connected to the primary upright member enables the construction of the appliance to be simplified and its robustness to be improved. Tilting the control panel backward allows for greater distance between the top of the control panel and the working bowl, limiting the risk of contact between the control panel and the working bowl when it is placed on the stand or removed therefrom.

The control panel may have a backward tilt of between 15° and 35° relative to the direction perpendicular to the worktop, and preferably a backward tilt of between 20° and 30° relative to the direction perpendicular to the worktop. These provisions improve visibility and access to the control panel.

The control panel can extend transversely relative to a side face of the head. In other words, the width of the control panel extends in a direction close to a direction perpendicular to said side face. If desired, the control panel may extend perpendicular relative to the side face of the head.

The control panel may have a control member configured to control the power supply of an electric motor of the household appliance for culinary preparation, said electric motor being configured to rotate the driver. If desired, the household appliance for culinary preparation may comprise a main on/off switch arranged outside the control panel.

The control member can be a rotary knob. Alternatively, the control member could, in particular, be a linear slider.

The control member can be a speed control button. If desired, the speed control button may have a position for pulsed operation.

The electric motor can be arranged in the head. This arrangement enables the construction of the appliance to be simplified.

The stand can carry a working bowl and the control member can be arranged at an upper edge of the working bowl. This arrangement makes it possible to balance good visibility of the control member with easy access to the control member.

According to one embodiment, the head may be connected to the primary upright member by an articulation device, and the control panel may comprise an unlocking member configured to release the head and allow the head to pivot relative to the primary upright member according to the articulation device. Alternatively, the head can be slidably mounted relative to the primary upright member, to separate the head from the stand in order to install or remove the working bowl.

The release member can be arranged below the control member. This arrangement enables the ergonomics of the appliance to be improved, since the user operates the control member more frequently than the release member.

The control panel may have a screen. The display is arranged on the secondary upright member forming a projection from the stand. The secondary upright member does not move relative to the stand and is less subject to vibration than the head. These provisions make it easier to read the screen.

The screen can be a touch screen. The human-machine interface (HMI) area is therefore very low-vibration, making it easier to read the screen and use it.

The screen may extend to the head. This provision helps to improve the visibility of the screen, as well as access to the screen. Preferably then, the screen can extend above the level of the primary upright member.

The screen can be arranged above the control member. This provision enables the visibility of the screen to be improved, along with access to the screen.

The secondary upright member may have a lower portion forming an extension of one side of the primary upright member. This arrangement makes servicing the appliance simpler, while simplifying the design of the appliance and improving its robustness.

The secondary upright member may have an upper portion extending higher than the primary upright member. This arrangement allows for more room to arrange the control panel.

The thickness of the secondary upright member may be less than the width of the secondary upright member. This arrangement enables the footprint and weight of the appliance to be reduced.

The secondary upright member may rise away from the head. This arrangement reduces the vibration transmitted to the secondary upright member during operation of the appliance, especially when the electric motor is arranged in the head.

BRIEF DESCRIPTION OF THE FIGURES

The purposes, aspects and advantages of the present invention, according to the description given below of a particular embodiment of the invention presented by way of non-limiting example, will be better understood by referring to the attached drawings in which:

FIG. 1 is a front view in a plunging perspective of an embodiment of a household appliance for culinary preparation according to the invention.

FIG. 2 is an elevation side view of the household appliance for culinary preparation shown in FIG. 1, FIG. 3 is an elevation front view of the household appliance for culinary preparation shown in FIGS. 1 and 2, FIG. 4 is a slightly plunging perspective view of the household appliance for culinary preparation shown in FIGS. 1 to 3, in another orientation.

FIGS. 1 to 4 depict a household appliance for culinary preparation, comprising a base 1 intended to rest on a worktop and a head 5 mounted movable relative to the base 1.

The base 1 forms a stand 2 configured to receive a working bowl 3. The working bowl 3 is preferably removable in relation to the base 1. As shown in FIGS. 1 to 4, the stand 2 carries the working bowl 3.

The base 1 has a primary upright member 4 adjacent to the stand 2, better visible in FIGS. 1 and 2. The head 5 is mounted on the primary upright member 4, as can best be seen in FIGS. 1 and 2. As can best be seen in FIG. 2, the head 5 forms an upper arm 50 extending above the stand 2 in an extension direction. The head 5 has one end 51 opposite the primary upright member 4. The head 5 has a driver 7 arranged above the stand 2. The driver 7 is arranged under the upper arm 50. The driver 7 is configured to be coupled to a food processing accessory 10, as shown in FIG. 1.

The household food preparation appliance comprises an electric motor 11 configured to rotate the driver 7. In the exemplary embodiment shown in the figures, the electric motor 11 is arranged in the head 5. As shown schematically in FIG. 2, the electric motor 11 rotates the driver 7 via a transmission device 12. The transmission device 12 may include a reduction gear and/or bevel gear.

In the embodiment shown in the figures, the head 5 is pivotably mounted with respect to the base 1. To this end, the head 5 is connected to the primary upright member 4 by an articulation device 6, as can best be seen in FIG. 2. The head 5 is pivotably mounted between a raised position, shown in FIG. 1, and a lowered position, shown in FIGS. 2 to 4. When the head 5 is in the raised position, the working bowl 3 can be placed on the stand 2 or removed from the stand 2, and the food processing accessory 10 can be placed on the driver 7 or removed from the driver 7. The lowered position of the head 5 corresponds to the working configuration of the household appliance for culinary preparation used to prepare food in the working bowl 3 with the food processing accessory 10.

The base 1 has a secondary upright member 8 rising from the stand 2 laterally to the primary upright member 4 and to the head 5. As can best be seen in FIG. 4, the secondary upright member 8 is connected to the primary upright member 4. More particularly in the exemplary embodiment shown in the figures, the secondary upright member 8 has a lower part 81 forming an extension of a face 41 of the primary upright member 4. The secondary upright member 8 has a top portion 82 extending higher than the primary upright member 4. As can best be seen in FIGS. 1 and 3, the secondary upright member 8 rises away from the head 5. As can best be seen in FIGS. 2 and 4, the thickness of the secondary upright member 8 is less than the width of the secondary upright member 8.

The base 1 has a control panel 9 arranged on the secondary upright member 8. The control panel 9 is arranged laterally with respect to the stand 2, the primary upright member 4 and the head 5. In the exemplary embodiment shown in the figures, the control panel 9 extends transversely with respect to a side face 52 of the head 5. Thus, the control panel 9 extends transversely with respect to the direction of extension of the upper arm 50. As can be clearly seen in FIGS. 1 and 3, the secondary upright member 8 has an upper portion rising laterally away from the head 5, and the control panel 9 is arranged on the upper portion of the secondary upright member 8.

The control panel 9 comprises a control member 90 configured to control the power supply to the electric motor 11. In the exemplary embodiment illustrated in the figures, the control member 90 is a rotary knob. The control member 90 is, for example, a speed control knob making it possible to vary the speed of the electric motor 11. The control member 90 is arranged at an upper edge 30 of the working bowl 3.

The control panel 9 comprises an unlocking member 91 configured to lock the head 5 in the lowered position when the unlocking member is not pressed and to release the head 5 and to allow the pivoting of the head 5 to the raised position when the user maneuvers the unlocking member 91. The head 5 can then rotate relative to the primary upright member 4 according to the articulation device 6.

Preferably, the control member 90 and the unlocking member 91 are arranged in close proximity to one another. In the exemplary embodiment shown in the figures, the unlocking member 91 is arranged on the secondary upright member 8 below the control member 90.

In the embodiment shown in the figures, the control panel 9 comprises a screen 92. The screen 92 may be a display screen. The screen 92 may also be a touch screen making it possible, in particular, to control certain functions of the appliance; for example, the display of recipes and/or the performance of pre-programmed preparation functions in which the electric motor 11 rotates the driver 7 carrying the food processing accessory 10.

Preferably, the control member 90 and the screen 92 are arranged in close proximity to one another. In the exemplary embodiment shown in the figures, the screen 92 is arranged above the control member 90. The screen 92 extends to the head 5.

As can be clearly seen in the figures, the control panel 9 is tilted backward relative to the stand 2. Thus, the projection of the lower part of the control panel 9 in the direction perpendicular to the worktop is closer to the stand 2 than the projection of the upper part of the control panel 9 in the direction perpendicular to the worktop. The control panel 9 has a backward inclination with respect to the direction perpendicular to the worktop on which the household appliance for culinary preparation rests. The control panel 9 may have a backward tilt of between 5° and 45° with respect to the direction perpendicular to the worktop, preferably between 15° and 35° with respect to the direction perpendicular to the worktop, more preferably between 20° and 30° with respect to the direction perpendicular to the worktop. In the exemplary embodiment shown in the figures, the control panel 9 is tilted 24° backward in relation to the direction perpendicular to the worktop.

The working bowl 3 has a side wall 31 extending towards the upper edge 30 of the working bowl 3. In other words, the working bowl has a flared shape with a larger cross-section at the top of the side wall 31 than at the bottom of the side wall 31. Tilting the control panel 9 backward makes it possible to move the lower part 81 closer to the secondary upright member 8 bearing the unlocking member 91 of the side wall 31 of the working bowl 3, and to move the upper part 82 away from the secondary upright member 8 bearing the screen 92 of the upper edge 30 of the working bowl 3.

The household appliance for culinary preparation shown in FIGS. 1 to 4 is used in the following manner. The user may place the household appliance for culinary preparation in a frontal arrangement as shown in FIG. 1, wherein the stand 2 extends close to the user, while the primary upright member 4 is arranged behind the stand 2. The secondary upright member 8 arranged laterally with respect to the primary upright member 4 makes it easy to access the control panel 9, regardless of the position of the head 5. The end 51 of the head 5 placed in front of the user makes it possible to facilitate access to the food processing accessory 10 and to the working bowl 3. The screen 92 arranged in the upper part 82 of the control panel 9 tilted backward enables the screen 92 to be moved away from the handling area of the working bowl 3 while providing good visual comfort without the need for movement on the part of the user. The secondary upright member 8 arranged laterally with respect to the primary upright member 4 enables clearance for lateral movement of the working bowl 3. The tilted secondary upright member 8 from the stand 2 reduces the footprint of the appliance.

As a variant, the head 5 is not necessarily pivotably mounted with respect to the base 1. The head 5 may in particular be mounted slidably with respect to the base 1, in order to occupy a raised position enabling the placement or removal of the working bowl 3 as well as the placement or removal of the household appliance for culinary preparation 10.

As a variant, the control member 90 is not necessarily a speed control rotary knob.

As a variant, the control panel 9 does not necessarily have a screen 92.

Various modifications and/or improvements that are obvious for the person skilled in the art can be made to the embodiment of the invention described in the present description without departing from the scope of the invention defined by the claims.

The invention claimed is:

1. A household appliance for culinary preparation, comprising:

a base configured to rest on a worktop and a head mounted movable relative to the base, the base forming a stand configured to receive a working bowl, the head having an electric motor and a driver arranged above the stand and configured to be coupled to a food processing accessory, the base having a control panel, the control panel tilted back relative to the stand, with a backward inclination of between 5° and 45° relative to a direction perpendicular to the worktop, the base having a primary upright member adjacent to the stand, the head mounted on the primary upright member, the base having a secondary upright member rising from the stand laterally relative to the primary upright member and the head, the secondary upright member connected to the primary upright member, wherein the secondary upright member has an upper portion extending laterally away from the head, the control panel being mounted on the upper portion of the secondary upright member.

2. The household appliance for culinary preparation as claimed in claim 1, wherein the secondary upright member has a top portion rising laterally away from the head, and wherein the control panel is arranged on a top portion of the secondary upright member.

3. The household appliance for culinary preparation as claimed in claim 1, wherein the control panel has a backward tilt of between 15° and 35° with respect to the direction perpendicular to the worktop.

4. The household appliance for culinary preparation as claimed in claim 1, wherein the control panel extends transversely with respect to a side face of the head.

5. The household appliance for culinary preparation as claimed in claim 1, further comprising the electric motor configured to rotate the driver and wherein the control panel comprises a control member configured to control an electric power supply to the electric motor.

6. The household appliance for culinary preparation as claimed in claim 5, wherein the control member is a rotary knob.

7. The household appliance for culinary preparation as claimed in claim 5, wherein the control member is a speed control knob.

8. The household appliance for culinary preparation as claimed in claim 5, wherein the electric motor is arranged in the head.

9. The household appliance for culinary preparation as claimed in claim 5, wherein the stand carries the working bowl and wherein the control member is arranged at a top edge of the working bowl.

10. The household appliance for culinary preparation as claimed in claim 1, wherein the head is connected to the primary upright member by an articulation device, and wherein the control panel comprises an unlocking member configured to release the head and allow the head to pivot relative to the primary upright member according to the articulation device.

11. The household appliance for culinary preparation as claimed in claim 10, wherein the electric motor is configured to rotate the driver, and wherein the control panel comprises a control member configured to control an electric power supply to the electric motor, wherein the unlocking member is arranged below the control member.

12. The household appliance for culinary preparation as claimed in claim 1, wherein the control panel comprises a screen.

13. The household appliance for culinary preparation as claimed in claim 12, wherein the screen is a touch screen.

14. The household appliance for culinary preparation as claimed in claim 12, wherein the screen extends at the head.

15. The household appliance for culinary preparation as claimed in claim 12, wherein the electric motor is configured to rotate the driver, and wherein the control panel comprises a control member configured to control an electric power supply to the electric motor, wherein the screen is arranged above the control member.

16. The household appliance for culinary preparation as claimed in claim 1, wherein the secondary upright member has a lower portion forming an extension of a face of the primary upright member.

17. The household appliance for culinary preparation as claimed in claim 1, wherein the secondary upright member has a top portion extending higher than the primary upright member.

18. The household appliance for culinary preparation as claimed in claim 1, wherein a thickness of the secondary upright member is less than a width of the secondary upright member.

* * * * *